United States Patent [19]

Kirk et al.

[11] Patent Number: 5,451,266
[45] Date of Patent: Sep. 19, 1995

[54] METHOD FOR SPRAY WASHING FRUIT IN A BRUSH BED

[75] Inventors: William Kirk, Alta Loma; Henry A. Affeldt, Victorville; Keith Gilbert, Devore; David Lerew, Riverside, all of Calif.

[73] Assignee: Sunkist Growers, Inc., Ontario, Calif.

[21] Appl. No.: 297,062

[22] Filed: Aug. 26, 1994

Related U.S. Application Data

[62] Division of Ser. No. 201,431, Feb. 24, 1994.

[51] Int. Cl.$^6$ .............................................. A23L 1/212
[52] U.S. Cl. ....................... 134/25.3; 426/333; 426/335; 15/3.14; 99/534; 99/536
[58] Field of Search ............... 99/487, 516, 534, 536, 99/623, 626; 15/3.12, 3.13, 3.14, 3.16, 3.17, 3.18, 3.1, 3.19, 3.2; 134/113, 180, 181, 151, 25.1, 25.3, 34; 426/333, 335, 102, 331, 532, 547, 541, 615, 616, 419

[56] References Cited

U.S. PATENT DOCUMENTS

| | | | |
|---|---|---|---|
| 3,097,382 | 7/1963 | Angle | 15/3.13 |
| 3,621,503 | 11/1971 | Classen | 15/3.13 |
| 4,990,351 | 2/1991 | Orman et al. | 15/3.1 |
| 5,357,993 | 10/1994 | St. Martin | 134/180 |

*Primary Examiner*—David A. Scherbel
*Assistant Examiner*—Reginald L. Alexander

[57] ABSTRACT

Described is a method, particularly applicable to a brush bed conveyor system, by which objects, typically citrus fruit, are washed or sprayed. A moveable high pressure spray manifold is contained within a manifold carriage and is disposed within the conveyor chassis such that it is moved along above a brush bed by a conveyor chain. Separation bars extend from the conveyor chain to segregate the objects into queues retained within the spray pattern of the manifold. When the manifold reaches a predetermined end position, a release latch is decoupled from the separation bars to disconnect the separation bars and conveyor chain from the manifold carriage. The predetermined end position is sensed and the manifold carriage is quickly returned to its initial position by means of a selectively activated pneumatic piston assembly.

11 Claims, 13 Drawing Sheets

METHOD FOR SPRAY WASHING FRUIT IN A BRUSH BED

CROSS REFERENCE TO RELATED APPLICATION

This is a divisional of application Ser. No. 08/201,431, filed Feb. 24, 1994 and (originally) entitled "An Improvement in an Apparatus and Method for Spray Washing Fruit in a Brush Bed".

BACKGROUND OF THE INVENTION

1. Field of Invention

The invention relates to the field of spray washing objects on a conveyor system, and in particular to high-pressure spray washing of citrus fruit in a brush bed conveyor system.

2. Description of the Prior Art

It is well known to wash or spray objects, such as fruit or more particular citrus fruit, in conveyor systems from a fixed overhead spray manifold as the objects are being scrubbed or cleaned in a conveyor brush bed. The purpose for washing the citrus fruit may include, for example, not only removal of field dirt, contaminants and pesticides, but also, particularly in the case of high-pressure spraying, removal of scale insects or fungal microorganisms which might otherwise mar the appearance or cause later spoilage of the fruit. Such spray washing may occur in conjunction with treatment of fruit with special solutions, usually water soluble, as described, for example, in U.S. Pat. Nos. 4,990,351 (Orman, et al); 5,007,335 (Orman, et al); and 5,148,738 (Orman, et al)—all assigned to Sunkist Growers, Inc.

Typically, the fruit are loaded onto a brush bed conveyor system which aligns the fruit into the linear pockets between elongated cylindrical brush rollers, which are aligned transversely to the movement of the conveyor. A system of nozzles on a fixed manifold located above the brush bed rollers directs fluid onto the fruit passing below it. The rollers brush, scrub and rotate the fruit while the fruit is being simultaneously spray washed from above by the fixed spraying system. As described in one or more of the aforementioned patents, the solution may be filtered and recirculated for conservation and economy.

In order to provide sufficient rotation and exposure of the fruit to the scrubbing and spray washing action, the number of fruit which can be placed on the brush bed must necessarily be limited. A certain degree of open space must be provided to allow the fruit to turn and to be freely advanced down the brush bed.

It is inherent in the nature of the brush bed handling of the fruit that queuing of the fruit may exist with space between groups of fruit being urged down the brush bed. Typically, in order to maximize the effectiveness of the spray, the spray apparatus will have a coverage that completely extends over the entire washing area of the brush bed. Thus, water and/or solution is sprayed into areas of the brush bed which are empty because of the queuing of the fruit or the necessary open space which must be provided for proper fruit handling, with the result that the spray solution and, more typically, the power required to pump the solution can easily be wasted.

Furthermore, the fruit is loaded onto the brush bed from a hopper in a random manner. Large open areas of the brush bed can occur at any time during the washing process, particularly at the entry portions of the bed. These areas receive spray even if there is no fruit being loaded onto the brush bed, as long as there is any fruit on the brush bed which needs to be washed.

Finally, particularly in scale removal, it is desirable for a high-pressure (i.e., forceful, intensive) spray to cove the entire surface of each fruit, preferably several times.

Therefore, what is needed is an apparatus and method wherein the spray washing—particularly high-pressure spray washing—of fruit or other objects on brush beds may be more efficiently and effectively performed, in terms of minimizing the amount of wasted fluid and unnecessarily expended power used in pumping, and also in terms of improving the coverage of objects by the spray.

BRIEF SUMMARY OF THE INVENTION

The invention is an apparatus for spray washing objects with a pumped fluid. The objects are advanced along a bed. The fruit can be segregated on the brush bed by means of a plurality of transversely-oriented separation bars extending across the brush bed and drawn longitudinally down the length of the brush bed by means of the conveyor chain. Such separation bars would serve to segregate the fruit into batches and to urge the fruit forward over the brush bed and from one roller brush to the next.

The apparatus includes a spray manifold for delivering fluid to the objects on the bed. A moving mechanism moves the spray manifold while the objects are being advanced over the bed. Such movement of the manifold may, for example, be: longitudinal along with the objects as they move through the bed; in rotation of the spray nozzles about an axis which is transverse to the movement of the objects; along a track which is transverse to the motion of the objects; vertically in respect to the brush bed surface; or some combination of these and/or other forms of motion. As a result, the position and orientation of the spray may be controlled, and use of fluid and pumping energy in the spray manifold may be minimized, while improving the efficacy of washing of the objects.

Thus, in one embodiment the moving mechanism reciprocally translates the spray manifold between an initial position and an end position along the direction of object movement. This longitudinal movement may be through the entire length of the brush bed, or through some portion thereof. In another embodiment the moving mechanism rotates spray nozzles within the spray manifold about an axis transverse to the object motion, normally in a reciprocating rotational motion. In still another embodiment, the moving mechanism reciprocates the spray manifold transversely to the object motion. In a further embodiment, the moving mechanism allows the spray manifold to be selectively raised or lowered in respect to the level of the brush bed. Other embodiments entail combinations of such movements and/or other orientations and/or type(s) of movements.

In the principal illustrated embodiment the apparatus, in which the primary motion of the spray manifold is longitudinal (i.e., with the forward movement of the fruit through the brush bed), the apparatus further includes a release mechanism for releasing the spray manifold from the moving mechanism when the spray manifold has reached a predetermined end position. A return mechanism is provided for returning the spray manifold to an initial position. The moving mechanism is a chain conveyor and the release mechanism comprises a rotatable finger temporarily engaging the chain conveyor. The finger is rotated out of engagement with the chain conveyor when the spray manifold reaches the predetermined end position. The return mechanism is a selectively activated piston assembly. The piston assembly is arranged and configured to return the spray manifold to the initial position after the spray manifold reaches the predetermined end position. The piston assembly comprises a selectively activatable pneumatic piston. A sensor senses when the spray manifold reaches the predetermined end position. A controller controls activation of the pneumatic piston in response to sensing by the sensor.

In that embodiment, the sensor comprises a first sensor for sensing the configuration of the moving mechanism to determine when the moving mechanism has moved the spray manifold to the predetermined end position. A second sensor senses the configuration of the pneumatic piston to ensure the pneumatic piston is appropriately configured correspond to the predetermined end position. A third sensor determines that the pneumatic piston has fully returned the spray manifold to the initial position.

Still further, in the principal illustrated embodiment, the moving mechanism comprises a conveyor chassis enclosing the bed and a conveyor chain disposed in the conveyor chassis. The spray manifold is slideably coupled to the conveyor chassis so that the moving mechanism longitudinally reciprocates the spray manifold between the initial position and the predetermined end position by moving the spray manifold in the conveyor chassis between the positions.

In that embodiment, the moving mechanism includes a plurality of separation bars coupled to the chain. The separation bars urge the objects along the bed, and the release mechanism comprises a rotatable finger coupled to the spray manifold. The rotatable finger slidingly contacts the separation bars to move the spray manifold between the initial position and the predetermined end position. The release mechanism further comprises a fixed release plate disposed across the conveyor chassis. The rotatable finger rides onto the release plate when the spray manifold reaches the predetermined end position. The rotatable finger is rotated by the release plate out of contact with the separation bars to thereby decouple the spray manifold from the chain.

As previously pointed out, the apparatus may further include a mechanism for adjusting the vertical distance between the spray manifold and the brush bed surface according to the size of the objects or to provide a spray density to suit the particular application.

Although it can be used for spray washing of a wide variety of objects, the invention can be more particularly utilized as an apparatus for high pressure spray washing of fruit, e.g., for scale insect removal. Here, the spray manifold would comprises a high pressure spray manifold with high pressure fluid supply means. A chain conveyor assembly provides a conveying force in a predetermined direction to move the fruit in the predetermined direction. A conveyor chassis houses the chain conveyor assembly. In the principal illustrated embodiment, the manifold carriage is moveable longitudinally within the conveyor chassis. A brush bed is disposed in the conveyor chassis beneath the high pressure spray manifold. The fruit are disposed on the brush bed. A moving mechanism is coupled to the spray manifold and moves the spray manifold longitudinally to extend access of the spray manifold to the fruit to extend the period during which the rotating fruit is washed as the fruit is moved along the conveyor chassis. As a result, fluid is intensively provided through the high pressure spray manifold to the fruit on the brush bed underlying the high pressure spray manifold as the fruit moves down the brush bed, without unnecessary or inefficient delivery of fluid to other portions of the brush bed.

In one embodiment, the moving mechanism rotates the spray nozzles within the spray manifold to vary the angle of spray toward the fruit on the brush bed for at least part of the travel of the fruit thereon. Alternatively, the moving mechanism may move the spray manifold transversely to the direction of movement of the fruit, and may, at the same time, cause rotation of the spray nozzles, each in reciprocating fashion. This allows access to the fruit on the brush bed with a high pressure spray wash from still different orientations and positions while the fruit rotates and moves on the brush bed.

Although mechanical control of the various movement means is described herein, it is to be understood that programmed control of the various possible motion orientations and directions—and, indeed, the speed with which the objects pass through the washing/spraying step—can be effectuated through hard-wired or programmable computer means, coupled with sensors to determine the position of the objects being subjected to the washing or spray. It is believed that such computer/sensor means would be within the skill of the ordinary practitioner familiar with this art and the teachings hereof, and that accordingly they need not be described further herein.

Clearly, then, the apparatus of the invention contemplates such a variety of motions of the spray manifold that the practitioner, operating within the scope of the invention, can experiment to select the type of motion or combinations of motion of the spray manifold, and means to control such motion, which will prove most effective for the specific purpose required.

The invention can also be characterized as a method of spray washing objects on a conveyor system to reduce use of fluid and pumping energy for spray washing while optimizing the effectiveness of the spray. The method comprises the steps of disposing the objects on the conveyor bed. The objects may be separated into a queue within a predetermined area on the conveyor bed.

In one embodiment, only the queue of objects is spray washed for a predetermined time by moving a spray manifold longitudinally with the queue of objects. In this embodiment, the spray manifold is returned to an initial position for receiving another queue of objects on the conveyor bed after the spray manifold has been moved to a predetermined end position. In other embodiments, the spray is directed in other selected orientations and patterns as discussed above in respect to various embodiments of the apparatus of the invention.

Thus, in one embodiment the step of spray washing by moving the spray manifold is performed by reciprocatingly translating the spray manifold longitudinally along the conveyor system with the objects.

In another embodiment the step of spray washing by moving the spray manifold is performed by rotating the spray nozzles of the spray manifold about an axis which is transverse to the forward motion of the objects. The step of rotating the spray manifold is normally done in reciprocating fashion between an initial angular position and an end angular position.

The invention and its various embodiments may be better visualized by now turning to the following drawings wherein like elements are referenced by like numerals.

The invention and its various embodiments may now be understood by turning to the following detailed description.

DETAILED DESCRIPTION OF THE PREFERRED EMBODIMENTS

An improvement is made to a brush bad conveyor system in which citrus fruit is high pressure washed. A moveable high pressure manifold is contained within a manifold carriage and is disposed within the conveyor chassis such that, in the embodiment herein described in detail, it is moved longitudinally above a brush bed by a conveyor chain. Separation bars extend from the conveyor chain to segregate the citrus fruit into queues retained within the spray pattern of the manifold. When the manifold reaches a predetermined end position, a release latch is decoupled from the separation bars to disconnect the separation bars and conveyor chain from the manifold carriage. The predetermined end position is sensed and the manifold carriage is quickly returned to its initial position by means of a selectively activated pneumatic piston assembly.

In this manner, according to this embodiment of the invention, the high pressure manifold is carried along with the fruit over the brush bed to provide an extended time during which the fruit is washed without unnecessarily providing spraying fluid and the pumping energy to spray the fluid to other portions of the brush bed where fruit may not be present or subject to washing.

Figure 1:
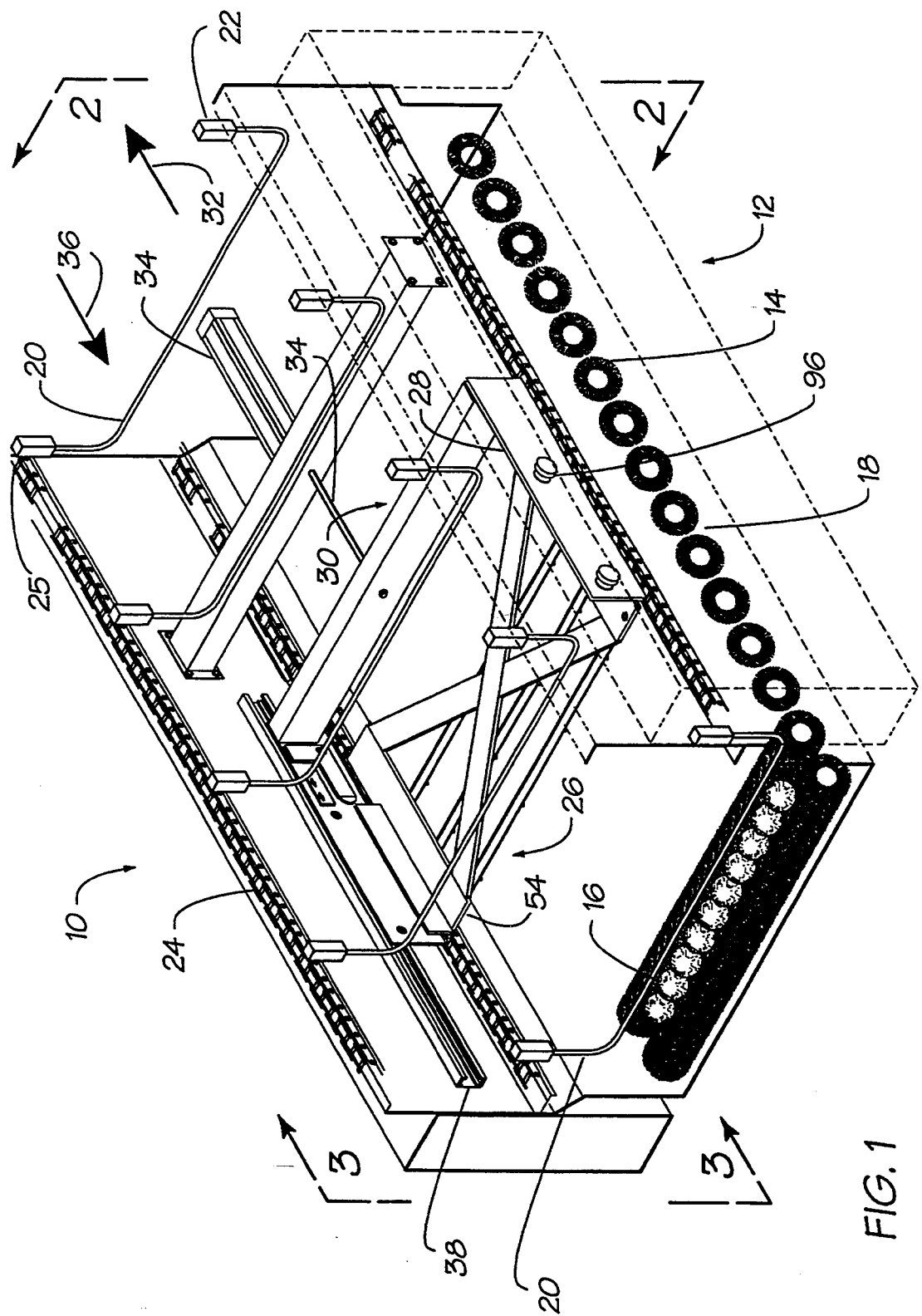
FIG. 1 is a simplified top perspective view of a portion of a brush bed having a moveable spray washing system devised according to an embodiment of the invention.

FIG. 1 is a simplified perspective view of the moveable high pressure wash system of this embodiment, generally denoted by reference numeral 10 of the invention. System 10 is installed in a conventional brush bed conveyor system, generally denoted by reference numeral 12. Brush bed system 12 comprises a plurality of cylindrical brushes 14 which are rotated by a chain drive through conventional means (not shown) to brush, scour and rotate fruit 16 which is disposed upon brushes 14 and generally aligned in the interstitial rows 18 between adjacent brushes 14. Any object on any conveyor system may be spray washed according to the invention, and the fluid sprayed may be any desired solution of any water-soluble compound(s), water with particulate suspension, water alone, some other suitable liquid or some combination thereof. Therefore, where reference herein is made to fruit or to a brush bed, it must be understood that it should be interpreted as including any object in place of the fruit, and any type of conveyor system in place of the brush bed.

In this principally illustrated, preferred embodiment, groups of fruit 16 are separated by a pair of separation bars 20 which extend across the width of brush bed 12 and are pivotally coupled at their top ends 22 to a conveyor chain 24. Conveyor chain 24 is an element of a conventional conveyor subsystem, including support rails, idler gears, drive gears, motors and control circuitry all well known to the art, but not shown for the sake of clarity.

Disposed over brush bed 12 in a manner as described in greater detail below is a movable high pressure spray manifold subsystem generally denoted by reference numeral 26. Spray manifold 26 is comprised of a manifold carrier 28 in which a piping manifold 30 is disposed. In the illustrated embodiment, manifold carrier 28 is releasably coupled to conveyor chain 24 by means of one of the plurality of separation bars 20 beneath it as described below. By virtue of this coupling, manifold carrier 28 is translated along the length of brush bed 12 in a direction indicated by arrow 32 during a first cycle of its operation.

In this embodiment, movement of manifold carrier 28 and piping manifold 30 are thus synchronized with the movement of fruit 16 and separation bars 20 on brush bed 12 below it and are carried along with fruit 16 for a predetermined distance and time. Water or spraying fluid is thus not being spent on fruit which are being assembled in brush bed 12 the front of piping manifold 30, which fruit may not yet have achieved an ideal density for spray washing.

At an end of a predetermined time or distance of travel, spray manifold 26 is released or decoupled from its corresponding separation bar 20, again by means described below in greater detail, and returned to its initial position by an air piston assembly, only a portion of the piston rod 34 of which is shown in FIG. 1 and which is more fully depicted in the side sectional view of FIG. 2. The air piston assembly will return spray manifold 26 to its initial position by extending piston rod 34 in the direction of arrow 36.

The illustrated embodiment shows an air piston assembly, but it is expressly contemplated that the air piston assembly can be replaced by a mechanical assembly which performs essentially the same function. For example, a geared transmission driven directly or indirectly by the conveyor system can be provided to selectively rotate a crank arm, such as through a Geneva movement or Pittman movement. The crank arm can be coupled by means of universal joints and a shaft to the manifold carriage to longitudinally translate the carriage in the same or a similar manner to that performed by the air piston assembly as described here.

Figure 2A:
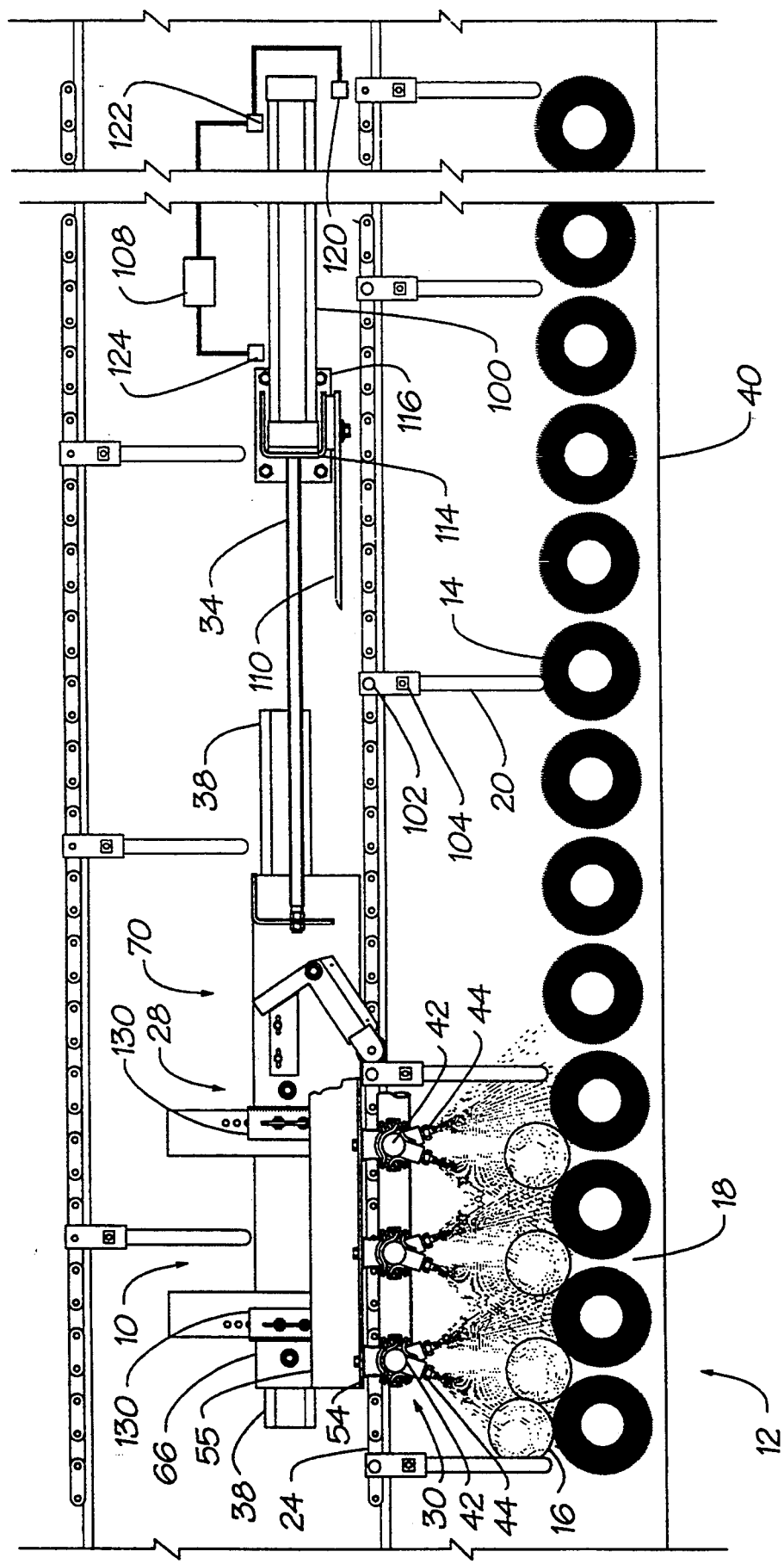
FIGS. 2a and b are a side elevational views of the apparatus of FIG. 1 as seen through section lines 2—2 of FIG. 1 and as configured in an initial position and in an end position respectively.
Figure 5:
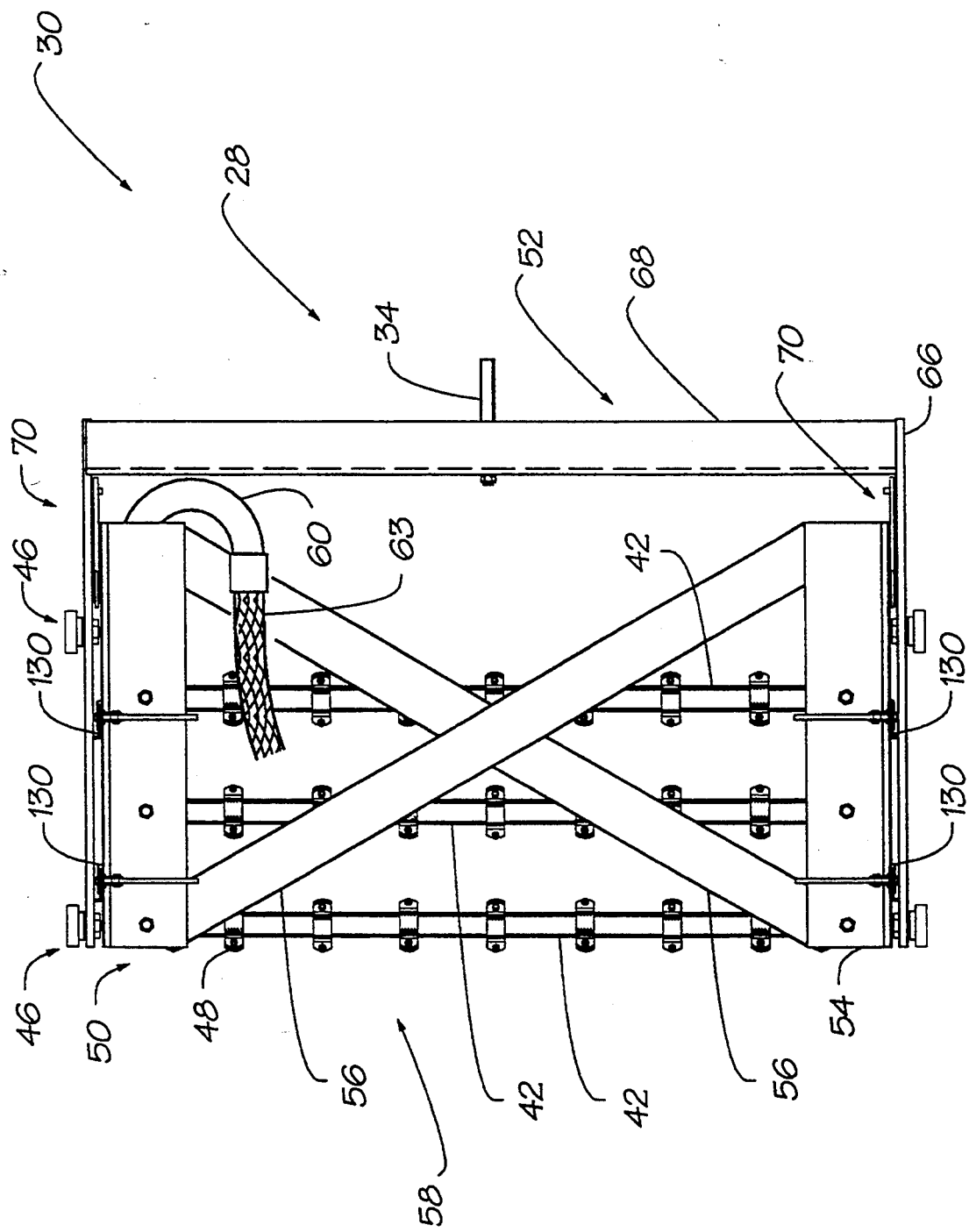
FIG. 5 is a perspective view of the manifold carrier of the invention shown in isolation of all other elements.

We turn now to the side elevational view of the high pressure wash system 10 of FIG. 1 as seen through section lines 2—2 of FIG. 1 and depicted in FIGS. 2a and b. FIGS. 2a and b clearly illustrate the cross sectional view of plurality of brush rollers 14 in the interstitial rows 18 in which are disposed plurality of fruit 16. Manifold carrier 28 is disposed on and rides on a rail 38 attached to the inner side wall 40 of brush bed 12. Piping manifold 30 is shown as projecting beneath manifold carrier 28 and includes a plurality of fluid distribution pipes 42 upon each of which is mounted a plurality of canted nozzles 44. Piping manifold 30 is better depicted in the top perspective view of FIG. 5. There it can be seen that carrier 28 provides a rigid box-like frame having a roller assembly 46 at each corner which engages rail 38 as better depicted and described in connection with the cross sectional view of FIG. 7. Nozzles 44, not visible in the depiction of FIG. 5, are mounted with brackets 48 on a pairwise basis. Brackets 48 then are coupled to pipes 42 and canted in an alternating series to provide an even spray coverage below carrier 28 on brush bed 12. The spray coverage of nozzles 44 are better depicted in the end elevational view of system 10 as seen through section lines 3—3 of FIG. 1 and depicted in FIG. 3.

Figure 4:
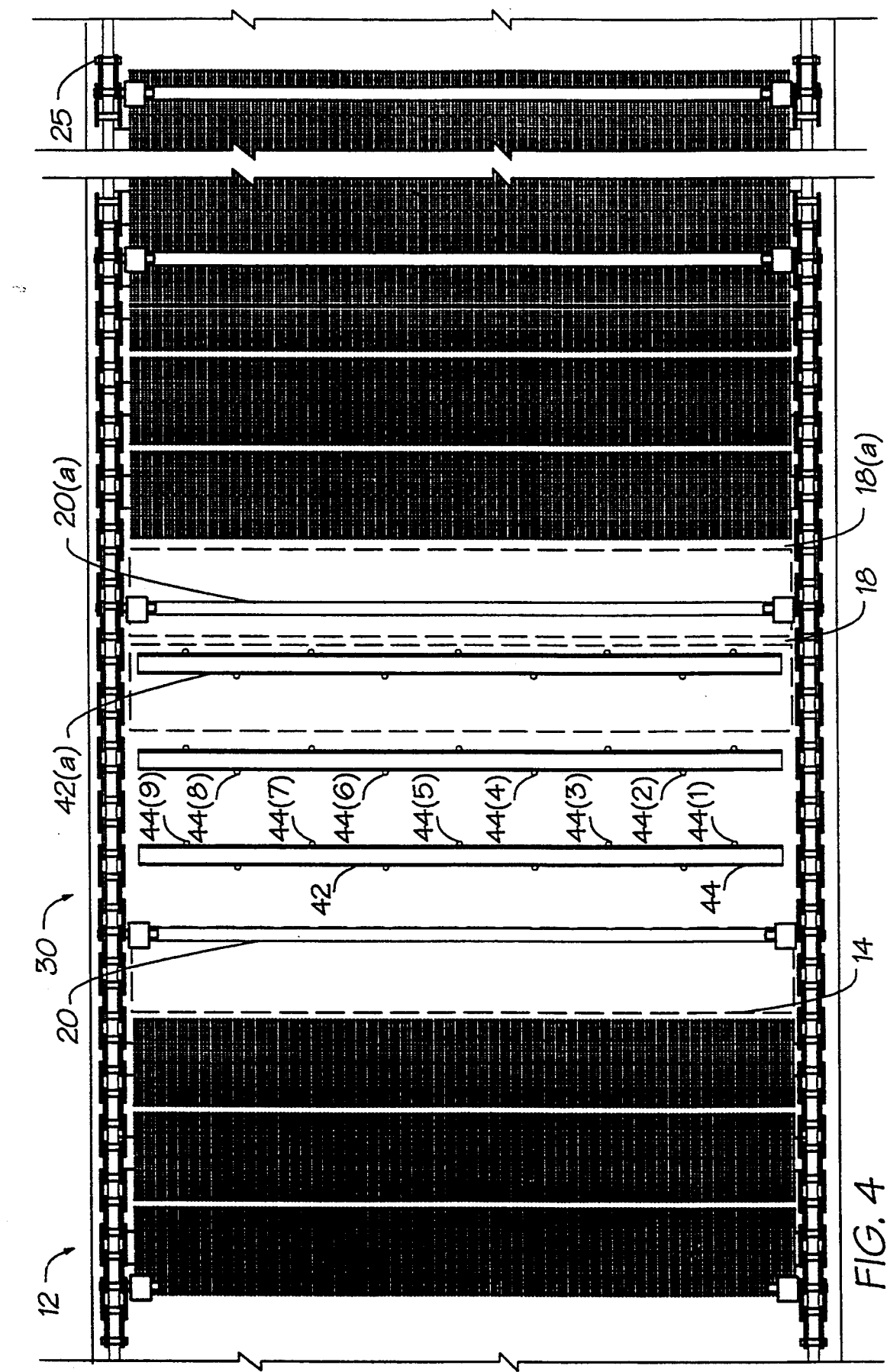
FIG. 4 is a top plan view of the apparatus of FIG. 1 with certain elements removed for clarity to illustrate the relationship between the spray nozzle piping apparatus, roller brushes and separation bars.

The configuration of piping manifold 30 is more clearly depicted in the top plan view of FIG. 4 wherein the upper elements of systems 10 have been removed for the purposes of clarity. As suggested hereinabove, any suitable spray configuration and/or orientation could be used without substantially affecting the invention as long as a predetermined spray pattern is delivered by piping manifold 30 to a desired portion of the queue of fruit lying beneath it.

Pipes 42 are generally aligned with the longitudinal axis of the underlying brush rollers 14. Therefore, nozzles 44 are seen as being generally directed to the interstitial rows 18 between rollers 14 in an alternating array between two adjacent supply pipes 42. For example, interstitial region 18a is served by nozzles 44(1)–(9) from supply pipe 42(odd) and nozzles 44(2)–(8) from supply pipe 42(even). The spray from nozzles 44 spreads out in a fan in the lateral direction on brush bed 12 in an overlapping relationship to fully provide high pressure wash substantially at each point on the underlying brushes 14.

In the illustrated embodiment as shown in FIG. 4, piping manifold 30 includes eight supply pipes 42, seven of which are positioned over underlying brush rollers 14 between adjacent separation bars 20 and one of which is positioned over the lead brush roller 14 immediately in front of the advanced separation bar 20(a). Although in the illustrated embodiment advance supply pipe 42a and the rear supply pipe 42b are provided with nozzles 44 only on one side, which nozzles are directed toward the interior of piping manifold 30, in other embodiments it might be more desirable for advance supply pipe 42a and rear supply pipe 42b to be provided with nozzles on both sides, as in the case of the remaining supply pipes 42. Each of the remaining supply pipes 42 are provided with canted nozzles 44 on each side of pipe 42.

Collection of the fluid sprayed, filtering of the collected fluid and recirculation of the collected, filtered fluid may be accomplished in the manner taught in the aforementioned U.S. Patents assigned to Sunkist Growers, Inc., which are each here incorporated by reference. Thus, a further economy can be realized by reuse of the fluid sprayed onto the objects.

Figure 6:
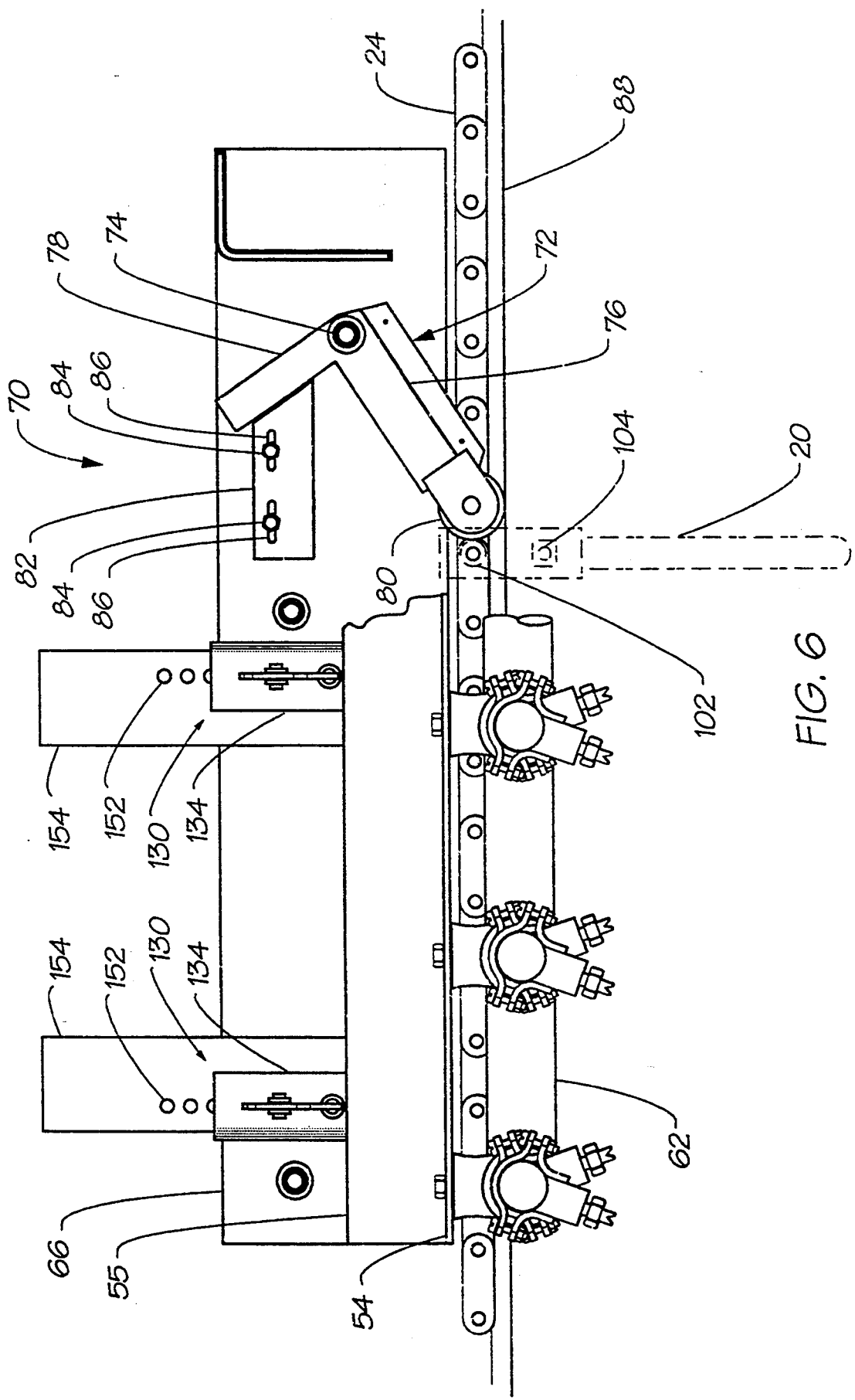
FIG. 6 is a side elevational view in enlarged scale of the release latch and assembly utilized to release and relatch the manifold carrier to the conveyor-driven separation bars as shown in FIG. 2.

FIG. 5 illustrates that manifold carrier 28 is comprised of a manifold superstructure generally denoted by reference numeral 50 and a manifold carrier box generally denoted by reference numeral 52. Manifold superstructure 50 is comprised of a pair of side rails 54 and two diagonal reinforcing straps 56 which form an X reinforcing cross structure between side plates 54. Cross-bars across box 52 may be added for reinforcement if desired. A plurality of supply pipes 42 are then fastened across and between side rails 54 beneath diagonal reinforcing straps 56. Each of the supply pipes 42 is supplied through a fluid distribution manifold 58 extending below one of the side plates 54, shown generally in FIG. 5. Thus, the piping manifold 30 comprises the distribution manifold 58 and the plurality of supply pipes 42 which are supplied with fluid through the distribution manifold. Fluid enters fluid distribution 58 by means of an inlet supply pipe 62, shown in cutaway view in FIGS. 3, 8 and 9. Inlet supply pipe 62 is supplied with fluid, through elbow 60, by means of a flexible high pressure hose 63 from a source forming part of system 10 (not shown). Manifold superstructure 50 in turn is coupled by flanges 64 to box 52. Box 52 is comprised of rigid side walls 66 and a rigid front wall 68. Wheel assemblies 46, shown in greater detail in FIG. 6, are then bolted to the front and rear portions of each side wall 66. Piston rod 34 is through-bolted into the center of front bar 68. Box 52 is open on its trailing edge and thus provides a U-shaped frame for carrying manifold superstructure 50 and the manifold of piping suspended beneath it.

Figure 7:
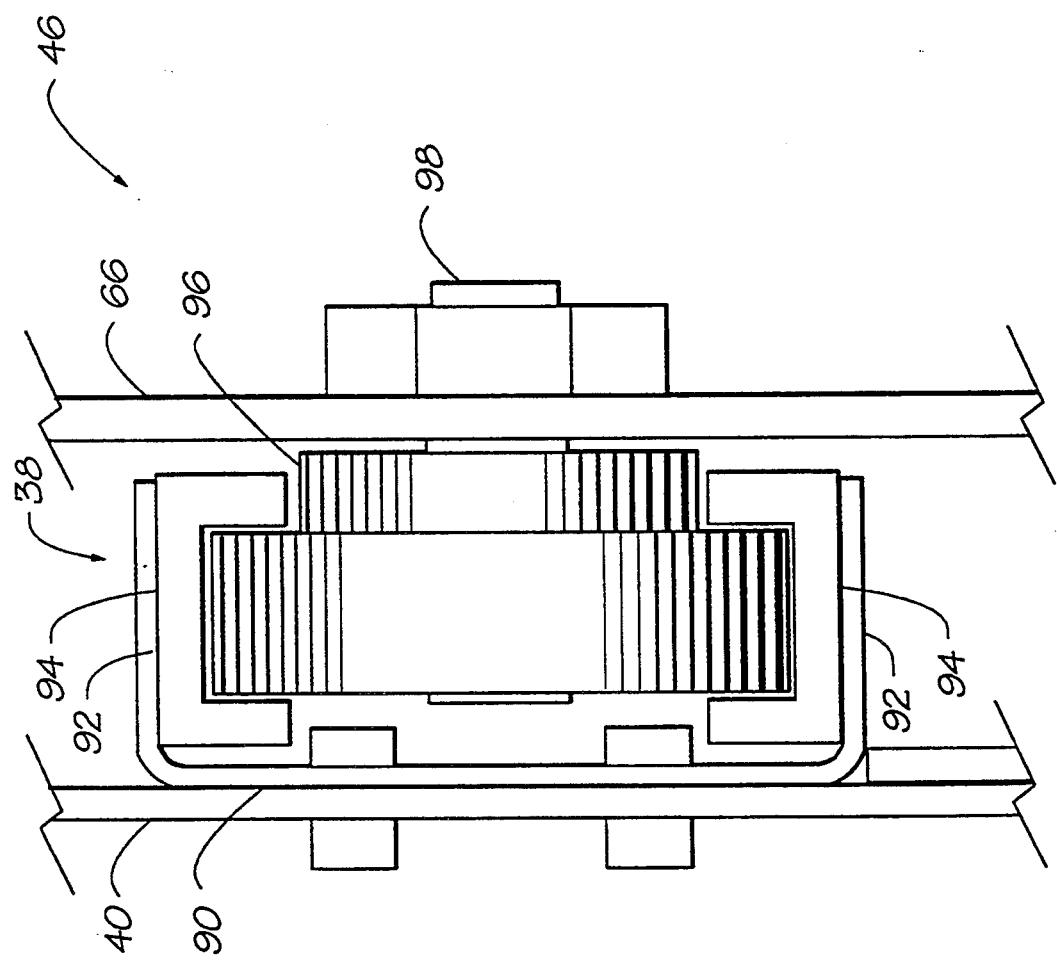
FIG. 7 is a cross sectional view in enlarged scale of the carrier track assembly for the manifold used in FIGS. 1 and 2.

Before considering the operation of the system in greater detail as a whole, we consider first the wheel assembly 46 as depicted in enlarged scale in FIG. 7. Track assembly 38 includes U-shaped rail 90 bolted to side wall 40 of brush bed 12. The upper and lower arms 92 of U-shaped rail 90 are provided with a plastic self-lubricating channel 94 in which rides a plastic bearing-equipped, steel self-lubricating wheel 96. Wheel 96 rotates about a bolt 98 which is fixed to side wall 66 of manifold carriage 30. As shown in FIG. 5, four of the wheel assemblies 46 are provided for manifold carriage 28 thereby securely retaining and guiding manifold carriage 28 along the length of track 38.

On the front corners of manifold box 52 is provided a trigger release assembly, generally denoted by reference numeral 70. Turn now to FIG. 6 wherein mechanism 70 is shown in greater detail. Assembly 70 is bolted to the inside surface of each front side wall 66 of manifold box 52. Release latch assembly 70 is comprised of a rotatable finger 72 pivoted about pivot point 74 and with a first arm 76 and second orthogonal arm 78. The end of first arm 76 is provided with a roller 80 for rolling contact against the upper fixture of separation bars 20 as will be described in greater detail in connection below with FIGS. 2a and 2b. Upper arm 78 contacts an adjustable stop block 82 bolted to wall 66 by means of a pair of bolts 84 provided through elongated slots 86. Stop block 82 is adjusted so that the lower most position of finger 72 can be securely and precisely adjusted to a level indicated by line 88 to insure exactly aligned contact with the upper end of separation bar 20.

The geometry of finger 72 is such that its center of gravity is to the left of pivot 74, as illustrated in FIG. 6, so that finger 72 in its normal position will rotate downwardly until arm 78 is stopped by block 82, leaving roller 80 at a lower most position defined by line 88. This allows roller 80 to meet the pivotal structure of separator bar 20 directly on center so that bar 20 is not rotated by the contact.

As described below, in this embodiment of the invention, manifold carrier 28 is carried along by conveyor chain 24 by contact of finger 72 with separation bars 20 which are connected to chain 24. When manifold carrier 28 reaches the end of its predetermined run, finger 72 will be rotated upwardly in a clockwise direction in FIG. 6 to disengage manifold carrier 28 from coupling with conveyor chain 24 through the described elements.

Figure 2B:
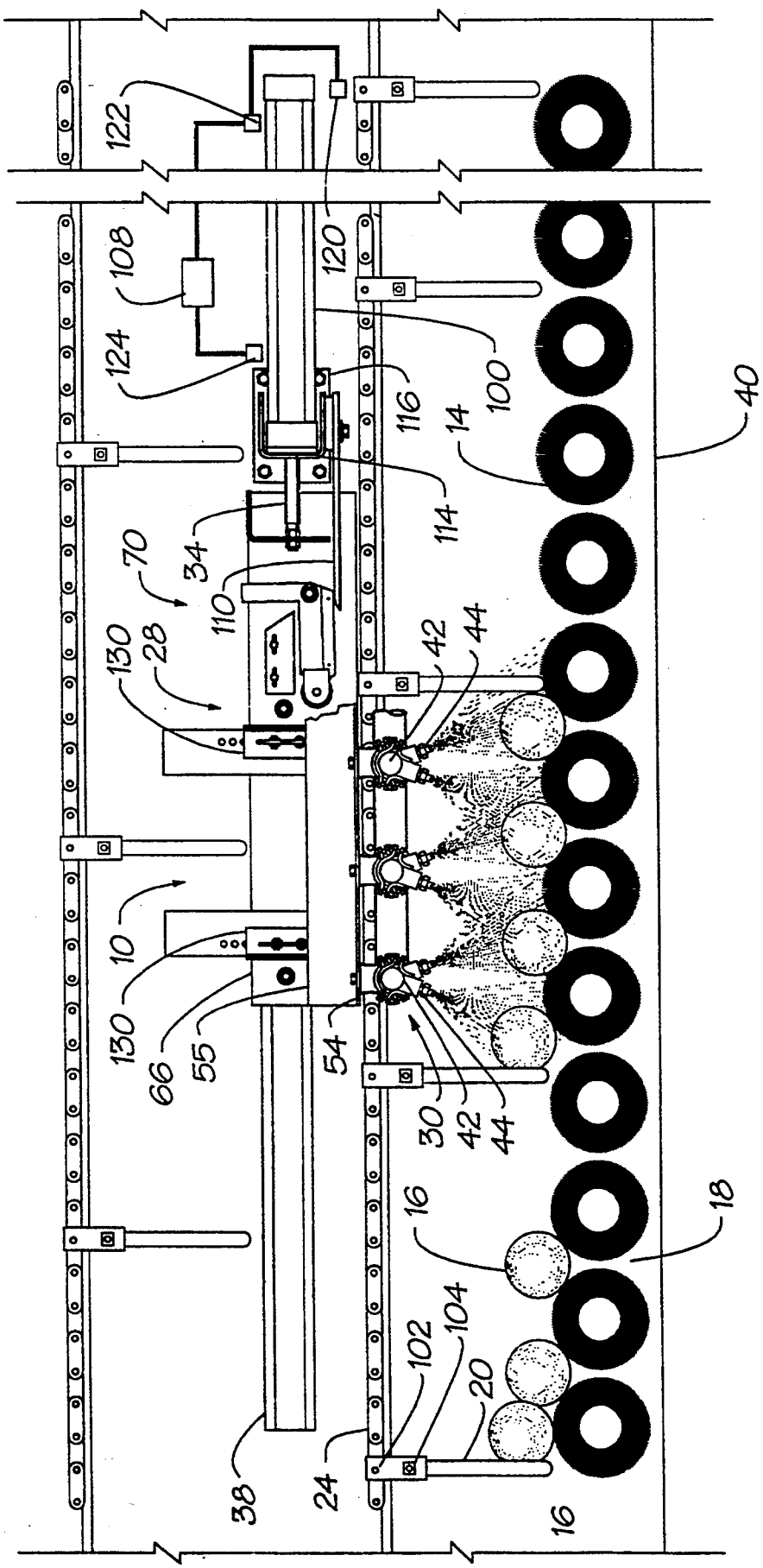
Figure 3:
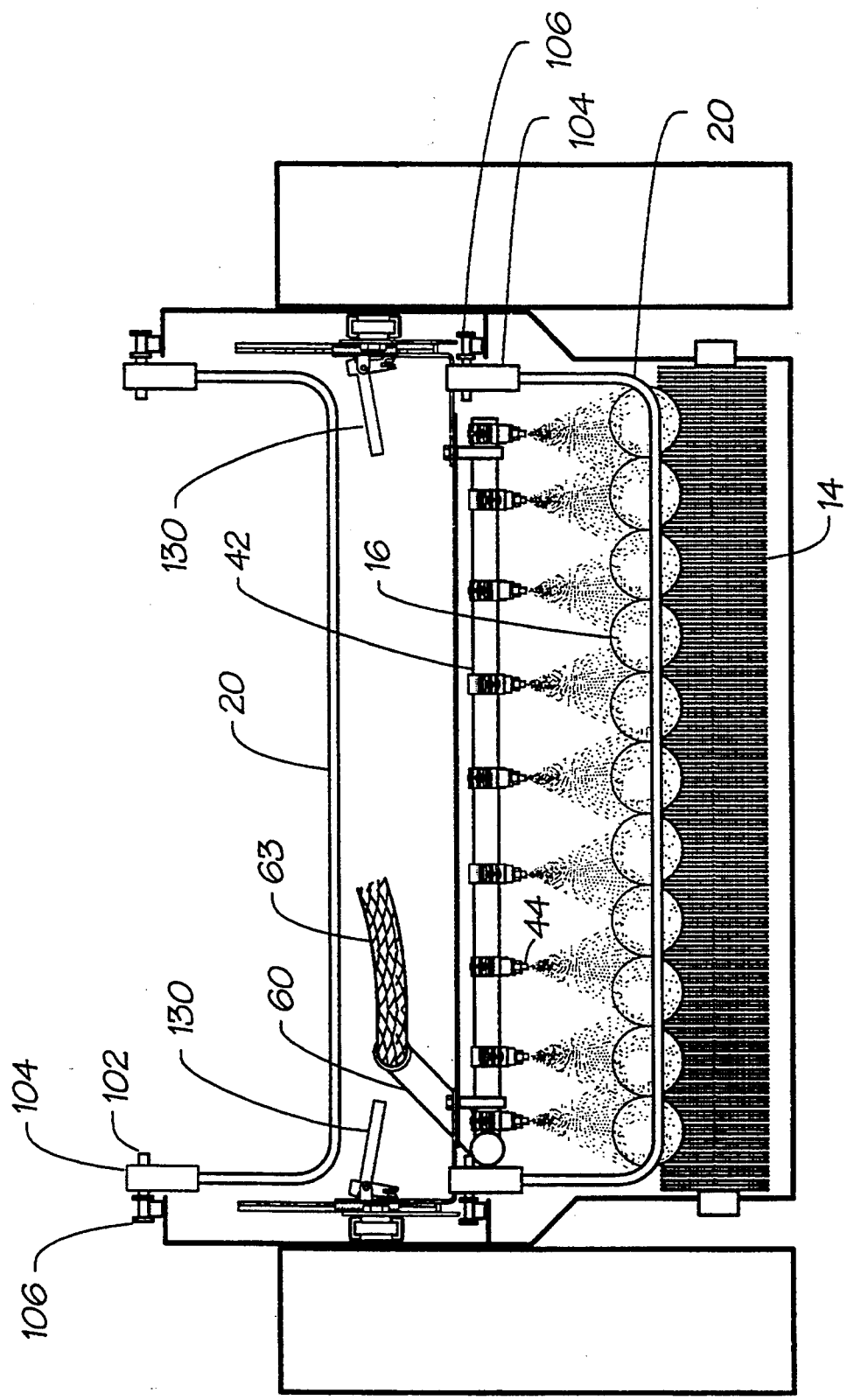
FIG. 3 is a front elevational view of the apparatus of FIG. 1 as seen through section lines 3—3 of FIG. 1.

The separate elements having been separately described, turn now to the side elevational views of FIGS. 2a and 2b which illustrate the operation of the system of this embodiment as a whole. FIG. 2a is a side elevational view of manifold carrier 28 in a first or initial position with piston rod 34 completely extended from air cylinder 100. Release 70 is shown in its downwardly extending position with wheel 80 bearing against the center pivot point 102 of the rotatable fitting 104 connected to chain 24 by pivot 102 and connected on its opposing end to separation bars 20. As shown in FIG. 3, separation bars 20 will be carried by chain 24 down brush bed 12 just above rollers 14 in contact with fruit 16 and then on the return course of the chain 106, bars 20 rotate downwardly as permitted by pivots 102. However, clockwise rotation in the illustration of FIGS. 2a and 2b are prohibited by the design of fitting 104 and pivot 102 through conventional means.

Thus, in the configuration of FIG. 2a, manifold carrier 28 is pulled by chain 24 by means of fitting 104 of separation bar 20 and latch 70 down track 38. Separation bar 20 also carries fruit 16 over rollers 14 with it. Air cylinder 100 is controlled by control circuit 108 so that it is vented during this phase and piston rod 34 easily slides into air cylinder 100 without resistance.

When manifold carrier 28 reaches a predetermined end position shown in FIG. 2b, a pair of horizontally extending plates 110 contact finger 72 lifting it about its pivot 74 and ultimately rotating finger 72 so that wheel 80 rolls off a contact with fitting 104 of separation bar 20. At this point, manifold carrier 28 is decoupled from conveyor chain 24. Plate 110 is coupled by means of spacer 112 to a U-shaped bar 114 extending across the width of brush bed 12. Bar 114 is bolted to the side walls 40 of brush bed 12 by means of a welded plate 116. Bar 114 also provides a means for fixing end 118 of air cylinder 100.

When system 10 has achieved the configuration of FIG. 2b, fitting 104 downstream from the just released fixture lying under the front of manifold carrier 28 will have reached a sensor 120. Sensor 120 detects the presence of the next adjacent fitting 104 and closes or provides a first satisfied condition. This signals to control circuit 108 that finger 72 has been lifted by plate 110 out of contact with separation bar fitting 104. As a fail-safe measure, a second sensor 122 then detects through a magnetic pickup whether piston rod 34 is sufficiently disposed into air cylinder 100 to reach its fully contracted position.

If both sensors 120 and 122 indicate an appropriate configuration of the system, control circuit 108 closes pressurizes air cylinder 100 by conventional means to quickly drive piston rod 34 to the left in FIG. 2b to reposition manifold carrier 28 in the start position shown in FIG. 2a. A third sensor 124 magnetically detects the configuration when piston 34 has completely repositioned manifold carrier 28 in its initial position thereby allowing control circuit 108 to vent air cylinder 100 in preparation for the redisposition of piston 34 into air cylinder 100 and a repeat cycle of the movements shown from FIGS. 2a to 2b and back.

Figure 8:
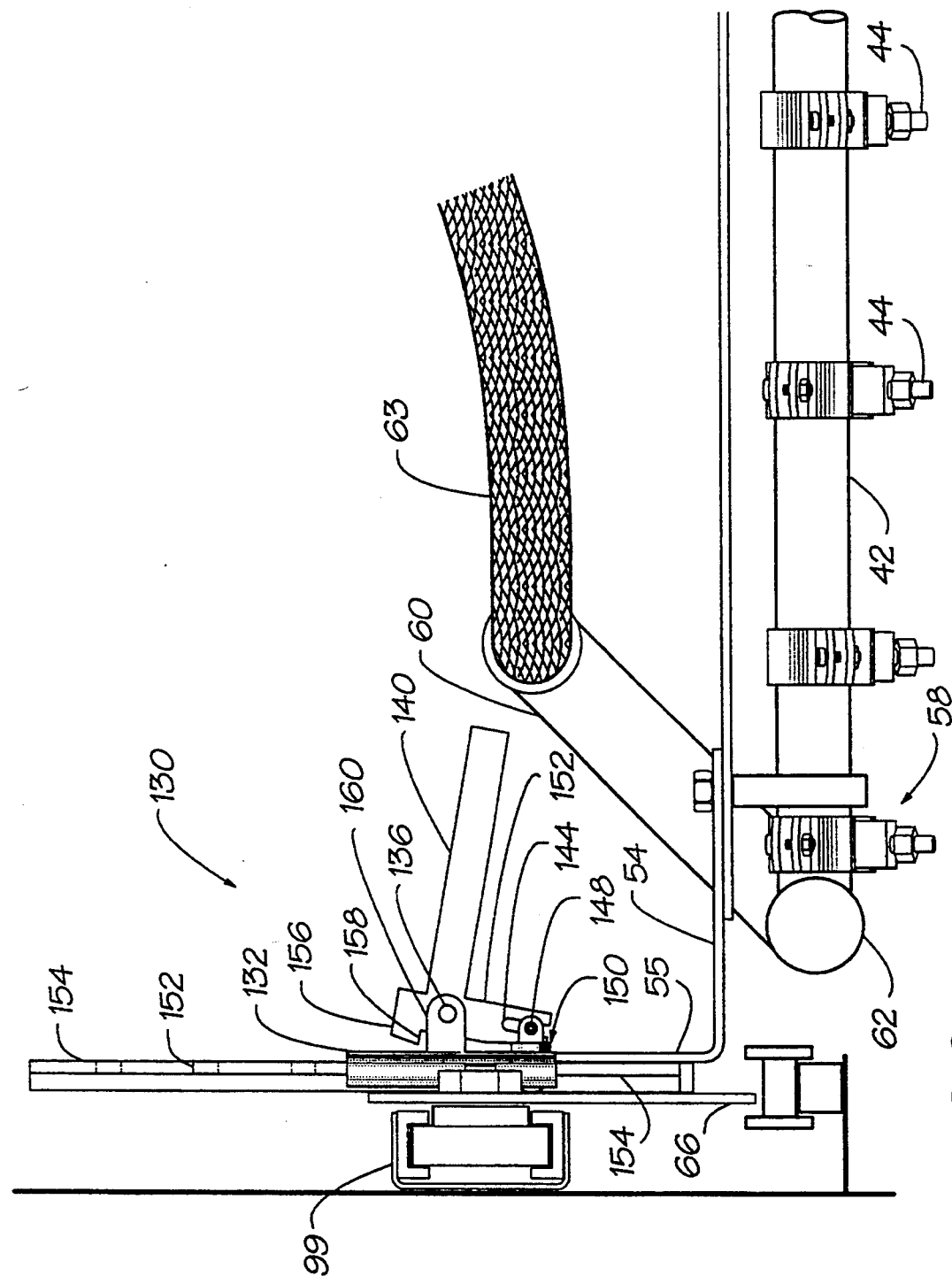
FIG. 8 is a simplified side elevational view of the manifold superstructure showing the mechanism for adjusting the vertical distance between the spray nozzles and the brush bed to compensate for differences in fruit sizes.

The vertical height of manifold subsystem 26 and manifold carrier 28 relative to brush bed 12 is adjusted by means of four lever actuated toggle pin assemblies, generally denoted by reference numeral 130, as depicted in FIGS. 2a and 2b, but best illustrated in connection with the side elevational view of FIG. 8. Fluid pipe 42 is connected to manifold superstructure 50, and in the view of FIG. 8 in particular to vertical plate 55 extending upwardly from horizontal plate 54. Assembly 130 may be slideable on plate 55 or attached thereto by conventional means such as bolted bracketing. The manifold superstructure 50 is then connected through plate 55 to a vertical adjustment plate 154 by means of assembly 130.

Toggle pin assembly 130 is comprised of an edge member 132 which is connected to a plate 134 best depicted in FIGS. 2a and 2b. A pivot 136 extends from plate 134. A lever arm 138 is rotatably coupled to pivot 136 which includes a hand lever portion 140 to provide mechanical advantage to rotate a slotted working arm 142 about pivot 136. Working arm 142 in turn has a longitudinal slot 144 in which a roll pin 148 is disposed. Roll pin 148 in turn is connected to a retractable pin assembly 150. Pin assembly 150 has a solid pin 151 which extends through side walls 66 of manifold superstructure 50 and through one of a plurality of adjustment holes 152 defined in vertical adjustment plate 154, most easily visualized in FIGS. 2a and 2b.

Opposing working arm 142 on pivot 136 is a stop arm 156 defining a stop edge 158 which can be rotated against fixture 160 holding pivot pin 136 to plate 134. This limits the counterclockwise rotation of assembly 130 as seen in FIG. 8 to appropriately maintain pin assembly 150 at least partially engaged with plate 55. In this manner, pin 150 never becomes totally disconnected from plate 55 and permits easier adjustment of manifold superstructure 50 upwardly and downwardly to the appropriate adjustment hole 152 defined through plate 154.

Plate 154 in turn is connected to roller assembly 46 as depicted in FIG. 7. Four such assemblies 130 are provided for coupling manifold superstructure 50 to wheel assemblies 46. In this manner, manifold superstructure 50 may be raised and lowered vertically with respect to brush bed 12 by manual adjustment of lever assemblies 130.

Figure 9:
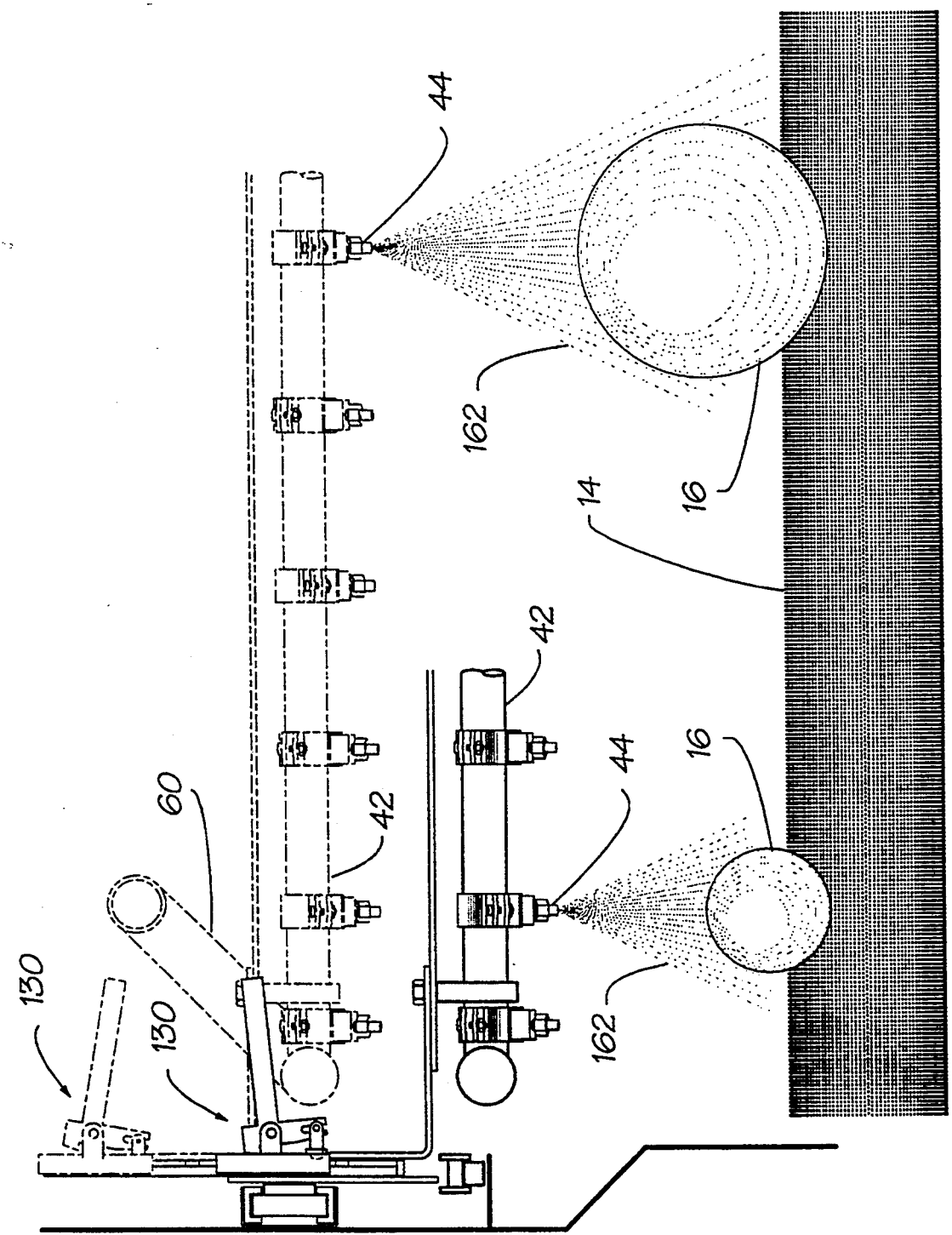
FIG. 9 is a diagrammatic depiction of the spray pattern from a nozzle provided according to the mechanism of FIG. 8.

FIG. 9 illustrates in diagrammatic view the adjustment of manifold superstructure 50. One of the nozzles of FIG. 4, for example 44(5), is shown in FIG. 9 as being adjusted between an uppermost and lowermost position above the brush bed. A range of possible sizes of fruit 16 on brush bed 12 is illustrated by concentric circles beneath nozzle 44(5). The fruit may, for example, range from small tangerines to large grapefruit. Vertical adjustment may also be desired in order to vary the intensity of the spray against the fruit, for example to dislodge stubbornly adhering scale. The spray pattern of fluid ejected from nozzle 44(5) is diagrammatically depicted by cones 162. Therefore, depending upon the size of fruit carried by brush bed 12 beneath nozzles 44 and/or the desired intensity of spray, the vertical height of all of the nozzles 44 in superstructure 50 is adjusted by the means shown in FIG. 8 to selectively and efficiently concentrate spray cones 162 on fruit 16. This allows a desired nozzle-to-fruit distance and spray intensity virtually regardless of the fruit size.

The principal illustrated embodiment has been shown in connection with a longitudinally reciprocating manifold superstructure 50 to provide efficient and increased wash access to all surfaces of fruit 16 as the fruit is tumbled over rotating brushes 14 beneath nozzles 44. Fruit 16 travels down brush bed 12 by being rotated by brushes 14 when lying in the interstitial row space 18 between adjacent brushes 14. As fruit 16 is urged forwardly down brush bed 12, in part by means of separation bars 20 and in part by the powered rotation of brush rollers 14, each item of fruit 16 will from time to time jump up and over the adjacent brush 14 and come to rest in the next or a downstream interstitial row 18. It is one of the objects of the invention to provide an efficient and multidirectional high pressure spray washing to all sides of each fruit 16 as it is carried down brush bed 12. The illustrated embodiment has shown a longitudinally reciprocating manifold superstructure which travels with the queue of traveling fruit 16 as it is tumbled and jumped downstream among rollers 14.

Figure 10:
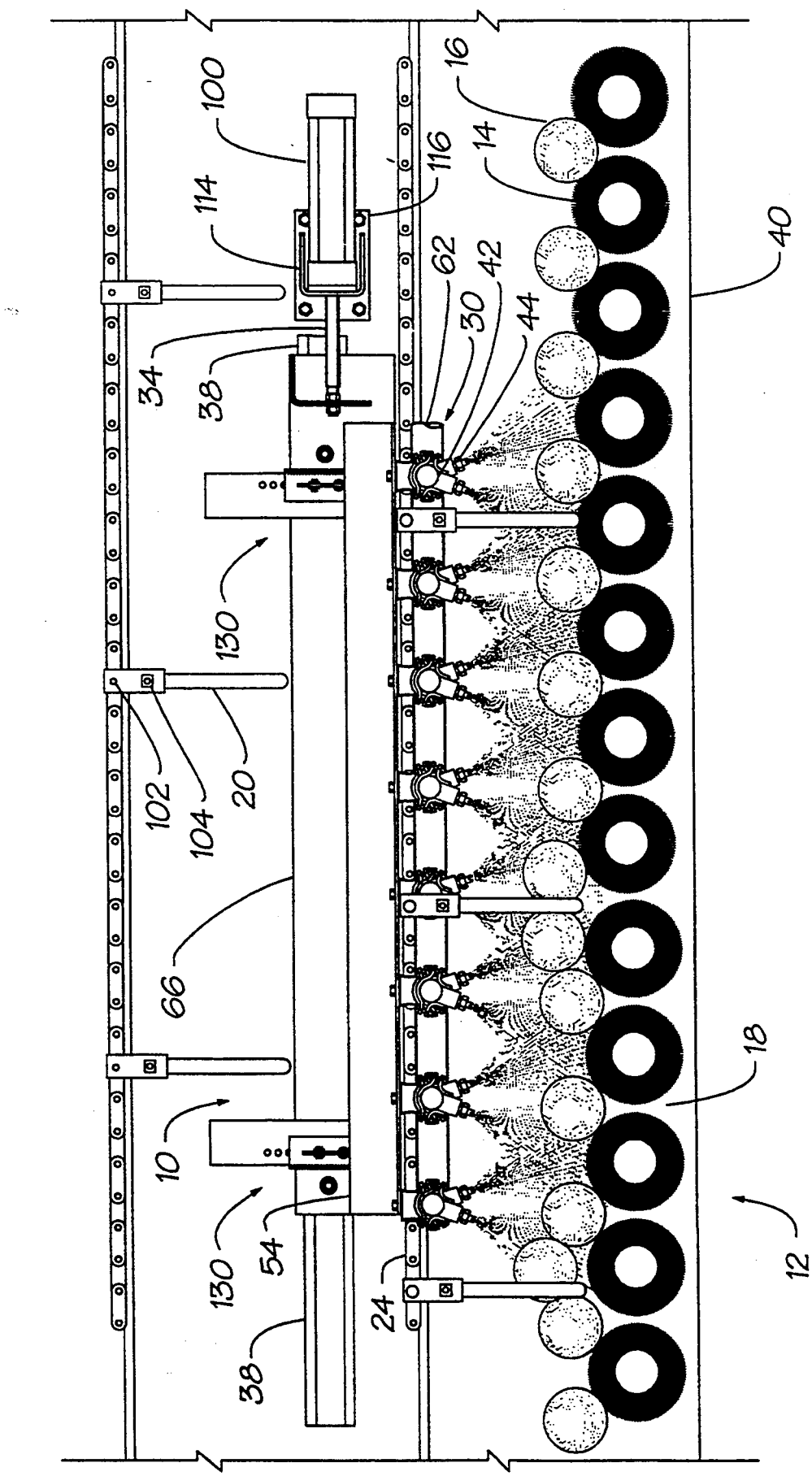
FIG. 10 is a side elevational view of a variation of the apparatus shown in FIG. 1, depicting a spray manifold which is relatively longer, in respect to the length of the brush bed, than that shown in FIGS. 2a and 2b.

As illustrated in FIG. 10, the length of the piping manifold 30 may vary from that shown in the embodiment illustrated in FIGS. 2a and 2b. In this embodiment, the longitudinal movement of the spray manifold 26 from its initial position to its end position over the brush bed is shorter. Thus, this embodiment allowing spraying of successive arrays of fruit, each of which overlaps the previous array to a desired extent.

Figure 11:
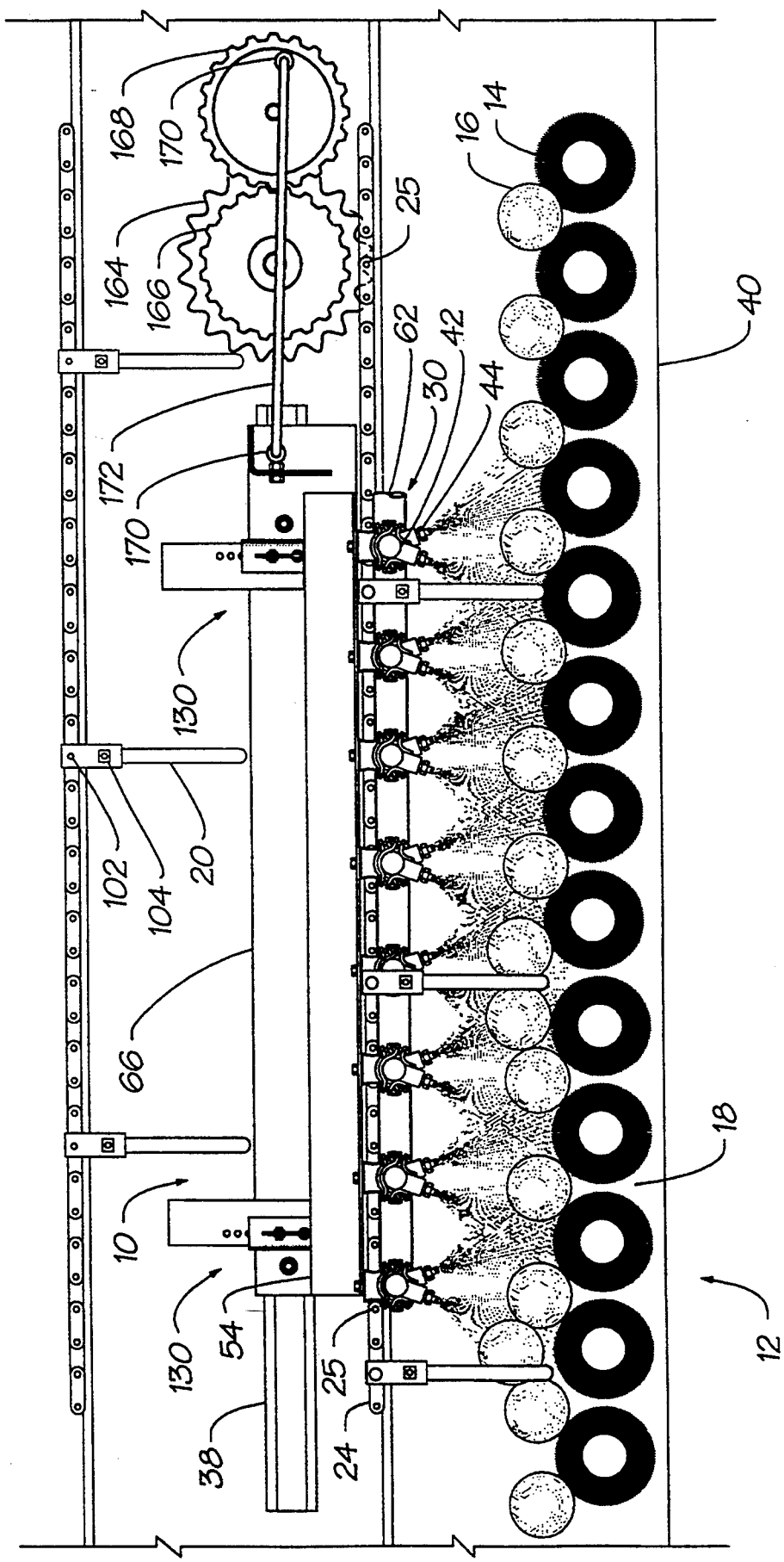
FIG. 11 is a side elevational view of another variation of the apparatus shown in FIG. 1, depicting means for creating reciprocating longitudinal motion of the spray manifold.

FIG. 11 illustrates yet another embodiment, in which the spray manifold 26 is caused to continuously reciprocate longitudinally. Here, motive power is provided by means of driven sprocket wheel 164 whose teeth are engaged with the chain link pins 25 of the conveyor chain 24. Transmission gear 166, which is concentric with the sprocket wheel 164 and either integral therewith or rigidly attached thereto, is engaged with, and drives eccentric gear 168. Reciprocatig shaft 172, attached to the eccentric gear 168 at one end through a universal joint 170 and connected at the other end to the manifold carrier 28, drives the piping manifold 30 in reciprocating longitudinal fashion as the chain 24 continually advances.

However, as suggested previously herein, it is also entirely within the scope of the present invention that the spray manifold could be moved in other ways, such as being transversely reciprocated across the width of brush bed 12, using a modification of the mechanism shown in FIGS. 2a, 2b and 10 to provide the reciprocating motion, and that instead of transverse reciprocation of the array of nozzles 44, an oscillatory transverse motion of the array of nozzles 44 could also be provided, by means of a modification of the mechanism shown in FIG. 11. It will be appreciated that any such modifications would be well within the skill of an ordinary practitioner, upon study of the teachings herein.

Figure 12B:
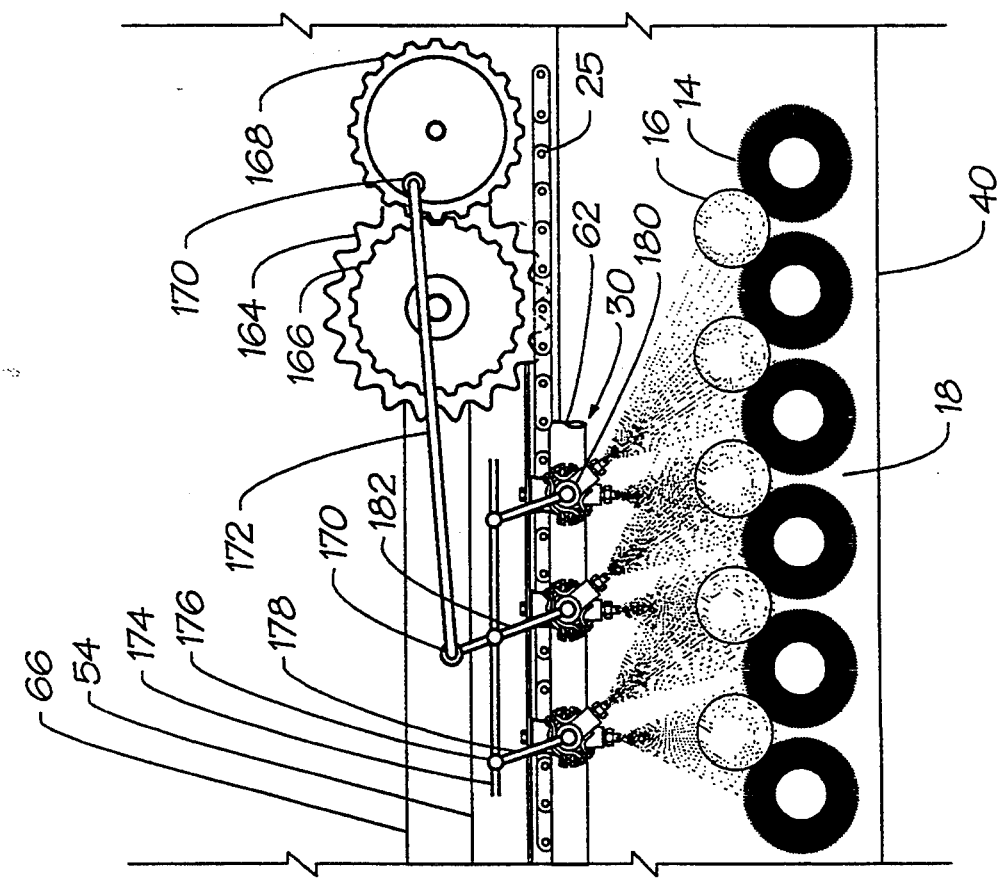
FIGS. 12a and 12b are detail side elevational views of yet another embodiment of the invention, showing, respectively, initial and final angular positions of the spray nozzles in this embodiment, wherein the nozzles are reciprocatingly rotated about an axis transverse to the forward motion of the fruit.
Figure 12A:
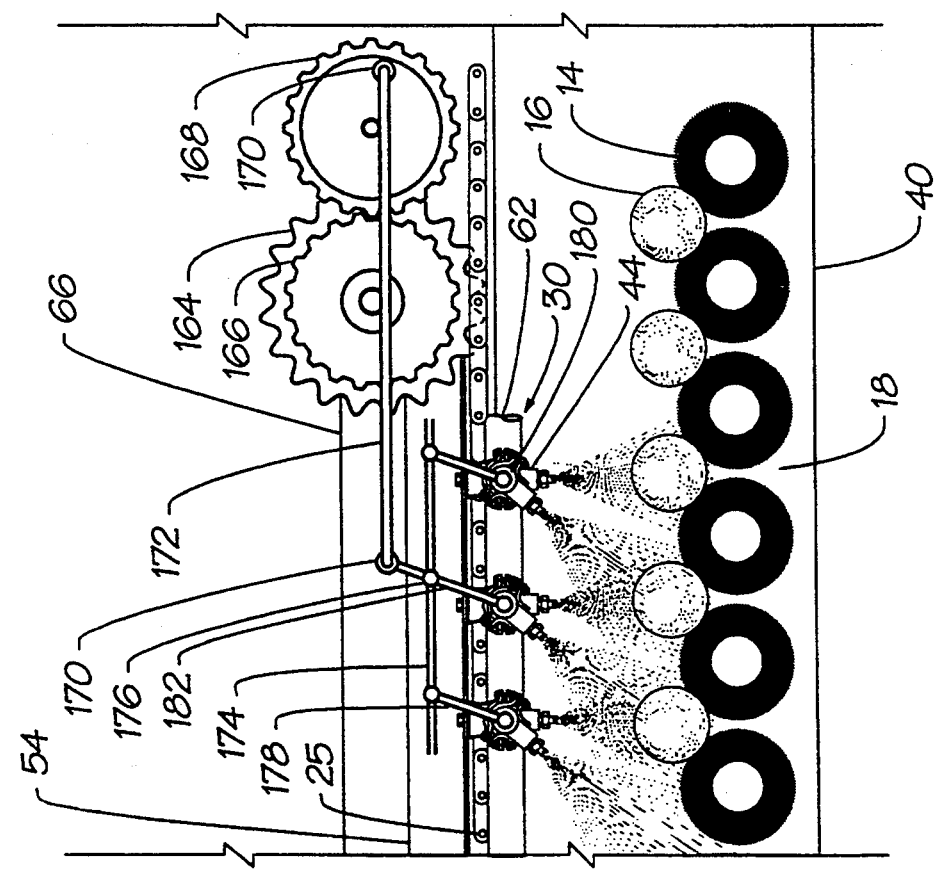

As a further example of alternative types of motion within the scope of the invention, FIGS. 12a and 12b illustrate an embodiment of the invention wherein the supply pipes are rotated about their axes in an oscillatory manner. This embodiment employs a driven sprocket wheel 164, a transmission gear 166 and a driven eccentric gear 168 all of which are similar in structure, positioning and function as the corresponding elements illustrated in FIG. 11. In the FIG. 12 embodiment, a reciprocating shaft 172 is coupled to the eccentric gear 168 through a first universal joint 170. The opposite end of the reciprocating shaft 172 is coupled to a driven swing arm 182 through a second universal joint 171. That driven swing arm is coupled to a reciprocating shaft 174 through a first swivel joint 176. Follower swing arms are likewise coupled to the reciprocating shaft 174, each through its respective swivel joint. The opposite end of the driven swing arm 182 and each of the follower swing arms 178 is coupled to one of the spray pipes 42, which, in this embodiment, is coupled to the piping manifold 30 (or supply pipe manifold 58) through a fluid-tight seal, through which the spray pipe may rotate. Thus, as the chain 24 advances, each coupled spray pipe 42 rotates in oscillatory fashion.

Further alternative embodiments, well within the skill of the ordinary practitioner and within the scope of the present discussion are also possible, as suggested hereinabove. Examples night encompass rotational motion from a pivot point above the bed, whereby the spray traces circular paths in the plane of the surface of the brush bed. And additional embodiments, including combinations of the types of motion discussed or types of motion even beyond those suggested herein—perhaps with the type(s) of motion and/or the speed of fruit movement controlled with sensor-driven, hard-wired and/or programmable computer means—might be developed by the practitioner within the scope of the invention.

Therefore, it must be expressly understood that not only reciprocating systems and oscillatory systems, but many different types of arrangements may be utilized according to the teachings of the present invention, utilizing rotating or a combination of rotating and translating manifold washing systems to provide a direct and continuous high pressure spray wash that may or may not travel with the fruit queue as the fruit queue travels down the brush bed.

In general, therefore, it is to be understood that the concepts of "movement", "moving" and "motion" refer to movement of the spray manifold 26 or of the piping manifold 30 or fluid distribution manifold 58 or of the spray pipes 42 and/or of the nozzle(s) 44 relative to the spray pipe(s) 42, and encompass any mode(s), direction(s) and/or orientation(s) of travel/movement of the manifold 26 and/or any element(s) thereof relative to the objects to be sprayed, as desired.

Thus, many alterations and modifications may be made by those having ordinary skill in the art without departing from the spirit and scope of the invention.

Therefore, it must be understood that the illustrated embodiments have been set forth only for the purposes of example and that they should not be taken as limiting the invention as defined by the following claims. The following claims are, therefore, to be read to include not only the combinations of elements which are literally set forth, but all equivalent elements for performing substantially the same function in substantially the same way to obtain substantially the same result. The claims are thus to be understood to include what is specifically illustrated and described above, what is conceptually equivalent, and also what essentially incorporates the essential idea of the invention.

We claim:

1. A method of spraying objects on a brush bed with fluid, comprising the steps of:

disposing said objects on said brush bed;

defining a first assemblage of said objects on said brush bed;

initially spraying only said first assemblage for a predetermined time by causing prescribed motion of spraying elements in respect to said first assemblage; and subsequently spraying a second defined assemblage of said objects for a predetermined time by causing prescribed motion of spraying elements in respect to said second assemblage.

2. The method of claim 1, further including the step of transporting said objects through said brush bed.

3. The method of claim 2, wherein said steps of initially spraying and subsequently spraying are each accomplished by causing fluid to be directed at high pressure toward said respective first and second assemblies, as the objects therein are transported through said brush bed, from a spray manifold incorporating said spraying elements.

4. The method of claim 3, wherein said steps of causing prescribed motion are performed by translating said spray manifold by means of a conveyor system, which conveyor system is also employed to accomplish said step of transporting.

5. The method of claim 4, wherein said step of translating is accomplished by advancing said spray manifold along the direction of motion of said objects, from an initial position to a predetermined final position and, upon reaching said final position, returning said spray manifold to said initial position.

6. The method of claim 5, wherein said steps of advancing and returning are conducted in reciprocating fashion.

7. The method of claim 1, wherein said steps of causing prescribed motion comprise rotating said spraying elements between a first angular orientation relative to said objects and a second angular orientation relative to said objects.

8. The method of claim 7, wherein said step of rotating comprises rotating said spraying elements in reciprocating fashion between said first angular orientation and said second angular orientation.

9. The method of claim 5, wherein said step of translating said spray manifold is performed by temporarily coupling said spray manifold to said conveyor system, and said step of returning said spray manifold to said initial position is performed by decoupling said spray manifold from said conveyor system when said spray manifold reaches said predetermined end position, followed by activating a piston assembly to move said spray manifold in a direction opposite to that in which said objects are carried by said conveyor system until said spray manifold returns to said initial position.

10. The method of claim 2, wherein said step of transporting is accomplished by providing a conveyor system to move said objects forward through said brush bed, and said assemblages of objects are each defined by separating said objects into respective queues by providing separation bars coupled to said conveyor system.

11. The method of claim 1, further comprising the step of changing the distance between said spraying elements and said brush bed.

* * * * *